United States Patent [19]
Petersson

[11] 3,899,308
[45] Aug. 12, 1975

[54] GAS PURIFICATION METHOD
[75] Inventor: Stig Arvid Petersson, Skelleftehamn, Sweden
[73] Assignee: Boliden Aktiebolag, Stockholm, Sweden
[22] Filed: Apr. 26, 1974
[21] Appl. No.: 464,465

[30] Foreign Application Priority Data
May 2, 1973 Sweden.............. 7361012

[52] U.S. Cl. ............ 55/8; 55/10; 55/11; 55/73; 55/122; 55/126; 55/135; 423/153
[51] Int. Cl. .............. B03c 3/01
[58] Field of Search ............ 55/6–11, 71, 55/73, 72, 167, 122, 126, 135; 423/153, 154, 517, 558

[56] References Cited
UNITED STATES PATENTS

| | | | |
|---|---|---|---|
| 1,204,906 | 11/1916 | Schmidt et al............. | 55/11 |
| 1,728,130 | 9/1929 | Mathesius et al.......... | 55/7 |
| 2,013,753 | 9/1935 | Hahn....................... | 55/10 |
| 2,681,121 | 6/1954 | Richardson............... | 55/8 |
| 3,094,409 | 6/1963 | Renzoni et al............ | 423/153 |

FOREIGN PATENTS OR APPLICATIONS

| | | | |
|---|---|---|---|
| 897,035 | 5/1962 | United Kingdom........ | 55/8 |
| 27,097 | 7/1932 | Netherlands.............. | 55/6 |

Primary Examiner—Bernard Nozick
Attorney, Agent, or Firm—Stevens, Davis, Miller & Mosher

[57] ABSTRACT

A process for selective purification of hot gases containing complex metallic dust in which the gases are first led to an electrostatic precipitator, whereafter the material is cooled in a first cooling step and then led to a second electrostatic precipitator and thereafter in a washing step washed with water and finally indirectly cooled in a second cooling step, the improvement being that the cooling in the first step is effected with the aid of water from the washing step and condensed water from the indirect cooling step and that water is added in the first cooling step in such a maximum quantity which can be completely vapourised.

5 Claims, 1 Drawing Figure

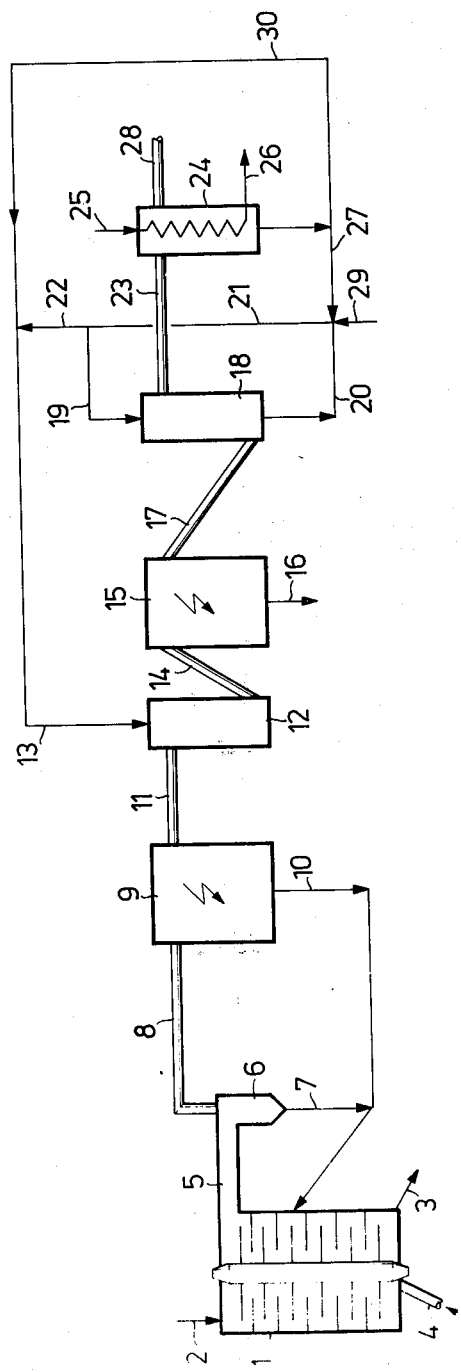

GAS PURIFICATION METHOD

The present invention relates to a process for the selective separation of dust from gases by arranging electrostatic precipitators in series and by returning the washing water after the final electrostatic precipitator to the hot gases which are cooled by vaporization.

In pyrometallurgical processes gases containing dust particles are invariably produced. These gases must be purified before they can be used in, for example, the preparation of sulphuric acid or released into the atmosphere. A large number of processes, such as cyclone separation or filtration by means of filter bags or electrostatic precipitator, are already known. All of these processes without exception aim at removing all solid constituents from the gases as effectively as possible within the scope of the capabilities of the process.

Among the processes, where dust must be removed from gases, those involving roasting, in which fine-grained sulphides are roasted, present specially great difficulties, due to the fact that the raw material is often of a complex nature. The waste gases can, for this reason, contain a large number of substances of greatly varying particle size distribution. Waste gases from roasting processes are in addition frequently of high temperature and for this reason they can also contain, apart from solid particles, volatile compounds of, for example As, Se and Hg. As typical examples of such processes giving waste gases of complex composition can be mentioned copper concentrates roasting, iron pyrites roasting and the roasting of sulphide ores containing Ni, Mo, Sb, Mn, Zn and As. In smelting processes which include the elements mentioned in oxidized form, for example, similar gas purification problems as in the roasting of sulphides can be encountered.

In, for instance, chalcopyrites roasting a floatation concentrate is firstly roasted in the furnace where the sulphur of the sulphide is either completely or partially oxidized to sulphur dioxide. The roast material is subsequently treated in a pyrometallurgical process in reactors suitable for extracting copper. The copper sulphide ores present in the natural state are frequently complex and often contain impurities such as PbS, ZnS, $Sb_2S_3$, $As_2S_3$ and HgS. these impurities often cannot be completely separated by ore dressing, for example, or by other known enrichment process which is why in the pyrometallurgical treatment of chalcopyrites concentrate therefore a complex dust is present in the waste gases which in addition contain sulphur dioxide as a substantial constituent. Sulphur dioxide is normally used for the preparation of liquid sulphur dioxide and sulphuric acid. In the preparation of sulphuric acid by the contact method the gases must be free from dust to avoid contamination of the catalytic substance. The dust from a pyrometallurgical process is often of considerable economic value. Thus, for reasons of process economy the dust must be recovered.

Gas from chalcopyrites roasting thus contains entrained particles, volatile substances such as $As_2O_3$ as well as Se and Hg compounds. The dust is usually recovered firstly in a dry separation device, such as a cyclone, after which the gas is washed and purified in, for example, a wet electrostatic precipitator to remove any remaining solid or volatile particles. As complete separation of all constituents as possible is aimed at and an elementary analysis of total separated dust in copper pyrites roasting can, for example, be as follows in percent by weight.

| | |
|---|---|
| Cu | 8% |
| Pb | 6% |
| Zn | 7% |
| Sb | 1% |
| As | 20% |
| Hg | 1,5% |
| Fe | 8% |

The composition varies of course from case to case within wide limits depending on the composition of the material.

When roasting pyrites, for example, the heat content of the waste gases is normally recovered in a boiler connected directly after the roasting furnace. Such plants are described, for instance, in Swedish Patent Specifications Nos. 303,737 and 304,295. Other plants are described in Erzbergbau und Metallhuttenwesen XXX (NFXXII) Jahrg. 1934, pp 197 – 201. A more general review of techniques used in gas purification is given in Batel: "Entstaubungstechnik", Berlin 1972, page 180 onwards. This describes a flow diagram for removing sulphur dioxide in gases from a fluidizing furnace used for roasting pyrite. Furthermore, it is clear from the U.S. Patent Specification No. 1,204,906 that dust is selectively separated by several electrostatic precipitators in series.

As mentioned above, gas purification involves large quantities of dust which can be of considerable economic value and which must, therefore, be recovered. The dust which is invariably complex, is therefore returned to the roasting furnace which means that certain substances are accumulated in the process. In these cases it becomes necessary to remove part of the dust for separate treatment to prevent accumulation of this kind. Such separate treatment often involves complicated plant and expensive processing. There is thus a need for a simple way of separating the various constituents of the gas so that, for example, one fraction can be returned without causing any accumulation in the process and the remaining fractions can be treated separately.

It has now surprisingly been shown that it is possible to carry out selective purification of gases containing various constituents in particle and gaseous form by first leading the gas to a warm electrostatic precipitator where particle-formed material is separated, after which the gas is cooled by vapourization allowing gaseous products to condense to be subsequently separated by a second electrostatic precipitator. The gas is then washed with water to remove any remaining particles still present and the same water is used in the cooling process as vapourization meduim.

It is obvious that even when the primary removal of dust as described above with reference to a hot electrostatic precipitator it is also possible to use other types of separation devices such as cyclones and bag filters. In certain cases the amount of dust is relatively small and in these cases it is possible to omit the hot electrostatic precipitator and recover the whole amount of dust in the second electrostatic precipitator. This of course means that the selectivity of the device is forfeited.

It has also been found to be very advantageous to separate certain washed out dust constituents by returning the water to the hot gas where it is vapourized in the cooling process. The solid substances contained in the fluid become freely-floating particles which are effectively precipitated in the subsequent dust filter. The method thus gives practically 100% selective recovery of the waste gas dust content and at the same time obviates the discharge of the water used for washing.

The method will now be illustrated with reference to the FIGURE which shows a flow-diagram of a purification plant based on the present invention. This particular case shows the purification of gases containing sulphur dioxide obtained by roasting chalcopyrites.

Chalcopyrites are led to a multi-stage furnace 1 via a conduit 2 and the roasted material is led off via conduit 3. Air is fed into the roasting furnace through conduit 4. Dust-laden gas is led off through conduit 5 to a cyclone 6 where entrained dust particles are substantially separated. The separated solid material is returned through conduit 7 to the furnace 1. The gas partially freed from dust is led through conduit 8 to a hot electrostatic precipitator 9 where the warm gases at a temperature of approx. 300°C are released of the dust particles still in the mainly copper, zinc, lead, iron and antimony compounds. The separated dust is returned by conduit 10 to the furnace 1. If this separated material contains large quantities of lead and antimony the dust, before being returned to the furnace 1, can be purified with respect to lead and antimony by known methods not shown in the FIGURE.

The purified gas is then led via conduit 11 to a cooling tower 12 where it undergoes cooling by vapourization effected by the injection of water through conduit 13. After the gas has been cooled to a temperature between approximately 100° and 150°C it is led through conduit 14 into a second electrostatic precipitator 15 where condensed particles of arsenic, selenium and mercury are separated and removed through conduit 16. The temperature that is chosen depends on the quantity of sulphur trioxide and the condensation point of the gas. Condensation of water must not take place in the electrostatic precipitator. The further purified gas is then led by way of conduit 17 to a washing tower 18 where the gas is washed with water supplied via conduit 19 and led away through conduit 20. Conduit 20 is linked via conduit 21 with conduit 19. Part of the washing water contaminated in the washing process is led via a branch conduit 22 to conduit 13 to be used as cooling water in the vapourization cooling process which takes place in the cooling tower 12. The gas is then led by conduit 23 to a cooling plant 24 consisting of an indirect cooler where the gas is cooled by water supplied through conduit 25 and led away by conduit 26. This cooling condenses some of the water in the gases and is led to the circulating washing water in the washing tower 18 through conduits 27 or through conduits 30 and 13 to the cooling tower 12. In certain cases it is necessary to bleed off a minor quantity of the circulating washing water in the washing tower because of absorption of sulphur trioxide in the washing water. The elimination of sulphuric acid formed can also be effected by addition of lime, ammonium hydroxide or sodium hydroxide. In a real case the cooling by vapourization was supplied with a quantity of gas of 40,000 $Nm^3/h$ containing approx. 0.8 $m^3$ $H_2O/h$ and the gas led off via conduit 28 contained 1 $m^3$ $H_2O/h$. The system must therefore be supplied with water at a rate of 0.2 $m^3$ $H_2O/h$. This is most conveniently done by conduit 29. The system has thus only three outlets for material, namely conduit 3 for roasted material, conduit 16 for arsenic, selenium and mercury and the gas outlet 28 for the purified gas. Approx. 4 $m^3$ $H_2O/h$ goes to the adiabatic cooling which corresponds to 0.1 l/h and $Nm^3$ gas. Most of the water used in the cooling by vapourization is obtained in the indirect cooling of the final stage. To avoid the accumulation of dust in the washing water, washing tower 18, some of this water is led to the first cooling step whereby the washed-out particles are released and precipitated at electrostatic precipitator 15.

The method described above has a large potential range of applications not only in roasting processes but also in the pyrometallurgical industry generally.

I claim:
1. A process of selective purification of hot gases containing complex metallic dust in which the gas is first led to an electrostatic precipitator where material in particle form is separated after which the gas in a first cooling step undergoes a cooling and thereafter is caused to pass a second electrostatic precipitator and in a washing step is washed with water and finally, in a second cooling step undergoes an indirect cooling, characterized in that the hot gases in the first cooling operation are cooled by means of vapourization of injected water in such a maximum quantity that the heat present in the gas is sufficient to vapourize completely the added water and that the added water is derived from the water washing step and from condensation in the second cooling step, so that in the products condensed in the first cooling step and those separated in the water washing step are obtained in the second electrostatic precipitator in a dry condition.

2. A process according to claim 1, characterized in that cooling in the first cooling step is effected by adding a part of the circulating water from the water washing step.

3. A process according to claim 1, characterized in that condensed water formed by the second cooling step is recirculated in the process.

4. A process according to claim 3, characterized in that the water is returned to the circulating water in the water washing step.

5. A process according to claim 1, characterized in that roaster gases from a pyrites roasting process are treated and that particles separated in the first electrostatic precipitator are returned to the roasting furnace.

* * * * *